(12) United States Patent
Numata

(10) Patent No.: US 10,247,939 B2
(45) Date of Patent: Apr. 2, 2019

(54) LENS UNIT, IMAGING APPARATUS, AND ON-VEHICLE CAMERA

(71) Applicant: KYOCERA Corporation, Kyoto (JP)

(72) Inventor: Yusuke Numata, Kawasaki (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 15/038,934

(22) PCT Filed: Nov. 25, 2014

(86) PCT No.: PCT/JP2014/005894
§ 371 (c)(1),
(2) Date: May 24, 2016

(87) PCT Pub. No.: WO2015/075951
PCT Pub. Date: May 28, 2015

(65) Prior Publication Data
US 2016/0377860 A1 Dec. 29, 2016

(30) Foreign Application Priority Data
Nov. 25, 2013 (JP) .................................. 2013-243053

(51) Int. Cl.
*B60R 1/00* (2006.01)
*G02B 27/00* (2006.01)
*G03B 17/02* (2006.01)

(52) U.S. Cl.
CPC ............ *G02B 27/0006* (2013.01); *B60R 1/00* (2013.01); *G03B 17/02* (2013.01); *B60R 2300/802* (2013.01)

(58) Field of Classification Search
CPC ........ G02B 1/18; G02B 27/0006; B60R 1/00; B60R 2300/802; G03B 17/02
See application file for complete search history.

(56) References Cited

U.S. PATENT DOCUMENTS

| | | | |
|---|---|---|---|
| 4,859,046 A * | 8/1989 | Traynor | B60R 1/082 359/850 |
| 7,208,723 B2 | 4/2007 | Takenaga et al. | |
| 7,247,838 B2 | 7/2007 | Takenaga et al. | |
| 9,278,670 B2 | 3/2016 | Hattori et al. | |
| 2005/0035926 A1 | 2/2005 | Takenaga et al. | |
| 2006/0243894 A1 | 11/2006 | Takenaga et al. | |

(Continued)

FOREIGN PATENT DOCUMENTS

| | | |
|---|---|---|
| JP | 3042480 U | 10/1997 |
| JP | H11-52454 A | 2/1999 |

(Continued)

OTHER PUBLICATIONS

Machine translation of JP 2009-157194.*
(Continued)

*Primary Examiner* — Kimberly N. Kakalec
(74) *Attorney, Agent, or Firm* — Studebaker & Brackett PC

(57) ABSTRACT

A lens unit includes an optical system for forming an optical image of a subject. The optical system includes an optical member. The optical member is disposed closest to the subject. The optical member includes a subject-side surface having at least one groove provided thereto. The optical member transmits the optical image of the subject.

12 Claims, 4 Drawing Sheets

(56) References Cited

U.S. PATENT DOCUMENTS

| | | | |
|---|---|---|---|
| 2007/0058270 A1* | 3/2007 | Lee | G02B 3/08 359/811 |
| 2008/0112050 A1 | 5/2008 | Nomura | |
| 2010/0134888 A1* | 6/2010 | Korenaga | B29C 45/0053 359/576 |
| 2011/0073142 A1 | 3/2011 | Hattori et al. | |
| 2012/0117745 A1 | 5/2012 | Hattori et al. | |
| 2012/0243093 A1* | 9/2012 | Tonar | G02B 27/0006 359/507 |
| 2016/0103315 A1* | 4/2016 | Weber | G02B 27/0006 348/148 |

FOREIGN PATENT DOCUMENTS

| | | | |
|---|---|---|---|
| JP | 2005-195566 A | | 7/2005 |
| JP | 2009157194 A | * | 7/2009 |
| JP | 2009-265473 A | | 11/2009 |
| JP | 2011-240914 A | | 12/2011 |
| JP | 2011-244417 A | | 12/2011 |
| JP | 2011244417 A | | 12/2011 |
| JP | 2013134366 A | | 7/2013 |

OTHER PUBLICATIONS

Digital Photography Review ('EEEK! Scratched front element!'. In Digital Photography Review Forum) [online] [retrieved on Jul. 30, 2018]. Retrieved from the Internet: <URL: https://www.dpreview.com/forums/thread/2944666>.*

International Search Report issued in PCT/JP2014/005894; dated Mar. 3, 2015.

Written Opinion issued in PCT/JP2014/005894; dated Mar. 3, 2015; with English language Concise Explanation.

JP Office Action dated Apr. 4, 2017, from corresponding JP Appl No. 2015-548999, with English statement of relevance, 3 pp.

An Office Action; "Notice of Reasons for Rejection," mailed by the Japanese Patent Office dated Nov. 28, 2017, which corresponds to Japanese Patent Application No. 2015-548999 and is related to U.S. Appl. No. 15/038,934; with English language Concise Explanation.

The extended European search report issued by the European Patent Office dated Jun. 20, 2017, which corresponds to European Patent Application No. 14864760.5-1562 and is related to U.S. Appl. No. 15/038,934.

* cited by examiner

FIG. 4
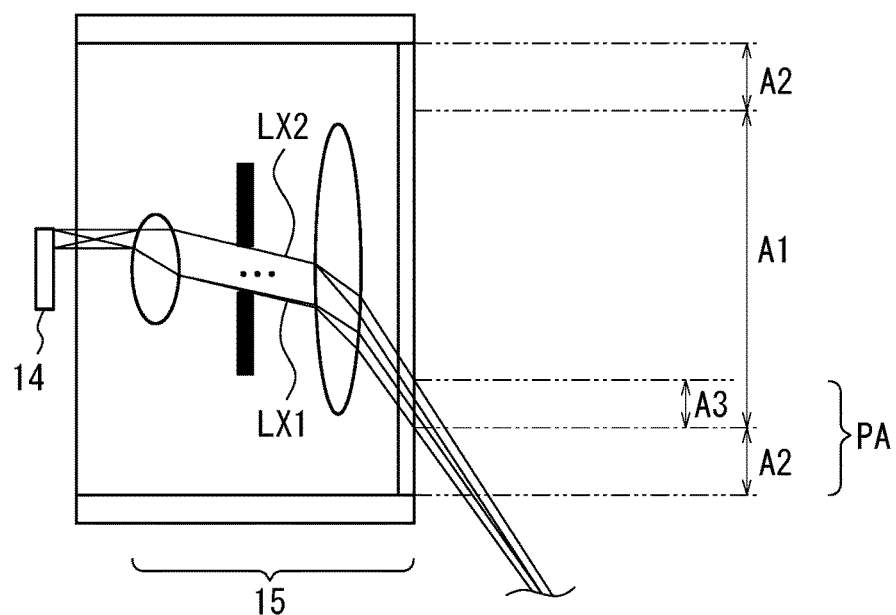
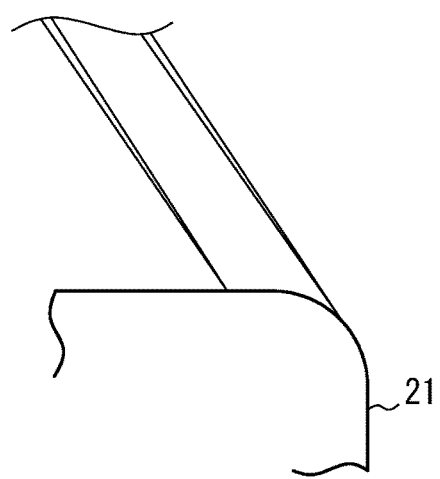

LENS UNIT, IMAGING APPARATUS, AND ON-VEHICLE CAMERA

CROSS REFERENCE TO RELATED APPLICATION

This application claims priority to and the benefit of Japanese Patent Application No. 2013-243053 filed on Nov. 25, 2013 and PCT application PCT/JP2014/005894 filed on Nov. 25, 2014, the entire contents of which are incorporated herein by reference.

TECHNICAL FIELD

The disclosure relates to a lens unit, an imaging apparatus, and an on-vehicle camera for appropriately removing water droplets from a surface thereof.

BACKGROUND ART

There have been known cameras, such as on-vehicle cameras and surveillance cameras, that are frequently exposed to an outdoor environment. A lens unit for such cameras for outdoor use is exposed to rainwater and cleaning fluid, letting water droplets sit on a surface of an optical member such as a lens. Since the water droplets on the surface of the optical member affect imaging performance of an optical system, it is desired that the water droplets be removed.

For the removal of the water droplets, it has been suggested to remove droplets of the cleaning fluid injected at the lens of the on-vehicle camera by utilizing a capillary phenomenon of a groove provided under a sensor cover (see PLT 1).

CITATION LIST

Patent Literature

PLT 1: JP-A-2011-240914

SUMMARY

Technical Problem

However, the on-vehicle camera described in the PLT 1 may remove the water droplets alone that reach a lower edge of the lens and cannot sufficiently remove the water droplets that do not reach the lower edge of the lens.

Therefore, it could be helpful to provide a lens unit capable of removing the water droplets sitting on the optical member, an imaging apparatus, and an on-vehicle camera.

Solution to Problem

In order to solve the above problem, a lens unit in a first aspect includes:
 an optical system for forming an optical image of a subject, the optical system including an optical member disposed closest to the subject, the optical member being provided with at least one groove on a subject-side surface and transmitting the optical image of the subject.
The lens unit in a second aspect, wherein,
 preferably, on the subject-side surface, the groove is provided in a predetermined area having hydrophilic property.
The lens unit in a third aspect, wherein,
 preferably, an area other than the predetermined area has water-repellent property.
The lens unit in a forth aspect, wherein,
 preferably, the predetermined area includes an outer area outside an area on the subject-side surface through which luminous flux of an optical image of the subject within an effective imaging range used by the optical system for image formation travels.
The lens unit in a fifth aspect, wherein,
 preferably, the predetermined area includes an area on the subject-side surface through which luminous flux of an optical image of a non-observation-target subject used by the optical system for image formation travels
The lens unit in a sixth aspect, wherein,
 preferably, a width of the groove is equal to or smaller than a width resolvable by the optical system.
The lens unit in a seventh aspect, wherein,
 preferably, the optical member is arranged outside a distance range of an observation-target subject predetermined for the optical system.
The lens unit in an eighth aspect, wherein
 preferably, at least the groove is black in color.
An imaging apparatus in a ninth aspect comprises:
 a lens unit including an optical system for forming an optical image of a subject, the optical system having an optical member disposed closest to the subject, the optical member being provided with at least one groove on a subject-side surface and transmitting the optical image of the subject; and
 an image sensor for imaging the subject image formed by the lens unit.
An on-vehicle camera in a tenth aspect comprises:
 an imaging apparatus including:
  a lens unit including an optical system for forming an optical image of a subject, the optical system having an optical member disposed closest to the subject, the optical member being provided with at least one groove on a subject-side surface and transmitting the optical image of the subject, and
  an image sensor for imaging the subject image formed by the lens unit.
The on-vehicle camera in an eleventh aspect, wherein preferably, the groove is provided in an area on the subject-side surface through which luminous flux of the optical image of the non-observation-target subject of a vehicle having the on-vehicle camera mounted thereon travels.

Advantageous Effect

According to our lens unit, imaging apparatus, and on-vehicle camera configured as described above may remove water droplets sitting on the optical member.

BRIEF DESCRIPTION OF THE DRAWINGS

In the accompanying drawings:
FIG. 4 is a diagram illustrating an optical path of the lens unit for explaining a predetermined area of the cover glass.

DETAILED DESCRIPTION

Hereinafter, an embodiment of the disclosure herein will be described with reference to the accompanying drawings.

Figure 1:
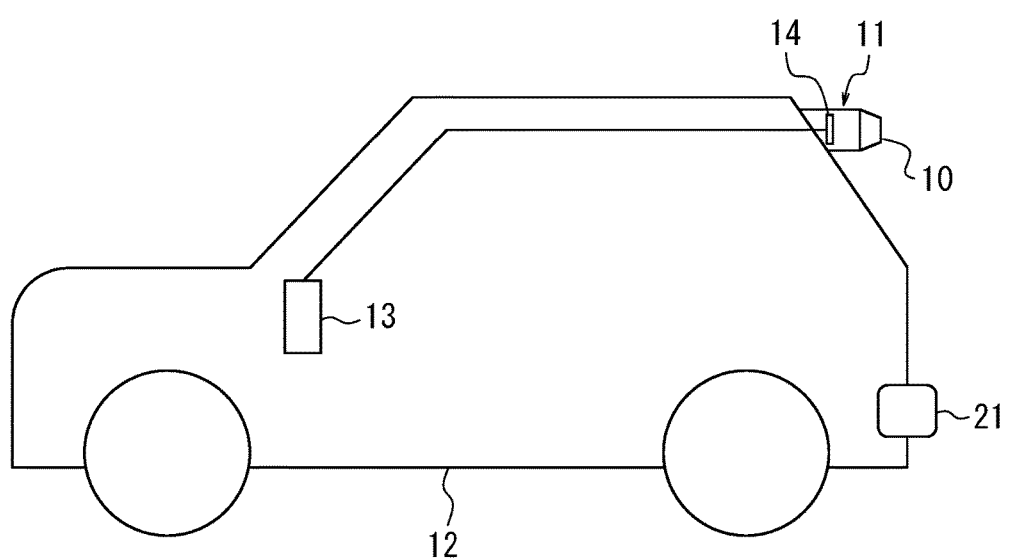
FIG. 1 is a layout diagram illustrating an arrangement of an imaging apparatus having a lens unit according to a first embodiment on a movable body.

First, an imaging apparatus having a lens unit according to one embodiment of the disclosure herein will be described. FIG. 1 is a layout diagram illustrating a mounting position of an imaging apparatus 11 having a lens unit 10 according to the present embodiment on a movable body 12. The imaging apparatus 11 is, for example, an on-vehicle camera. Also, the movable body 12 is a vehicle such as a car.

The imaging apparatus 11 having the lens unit 10, together with a display apparatus 13, is provided to the movable body 12. The imaging apparatus 11 is mounted outside the movable body 12 and capable of imaging therearound. According to the present embodiment, the imaging apparatus 11, for example, for the purpose of capturing a rear view image, is fixed to a rear exterior of the movable body 12. The display apparatus 13 is provided at a position visible from a driver's seat.

The lens unit 10 includes an optical system for forming a subject image behind the movable body 12 in the image sensor 14 inside the imaging apparatus 11. A distance range of an observation-target subject from the optical system 15 is predetermined, and the image sensor 14 is fixed to a position where the distance range corresponds to a depth of focus. The imaging apparatus 11 captures the subject image by using the image sensor 14 and thereby generates an image signal. Then, the imaging apparatus 11 transmits the image signal to the display apparatus 13. The display apparatus 13 displays the subject image corresponding to the image signal received.

Figure 2:
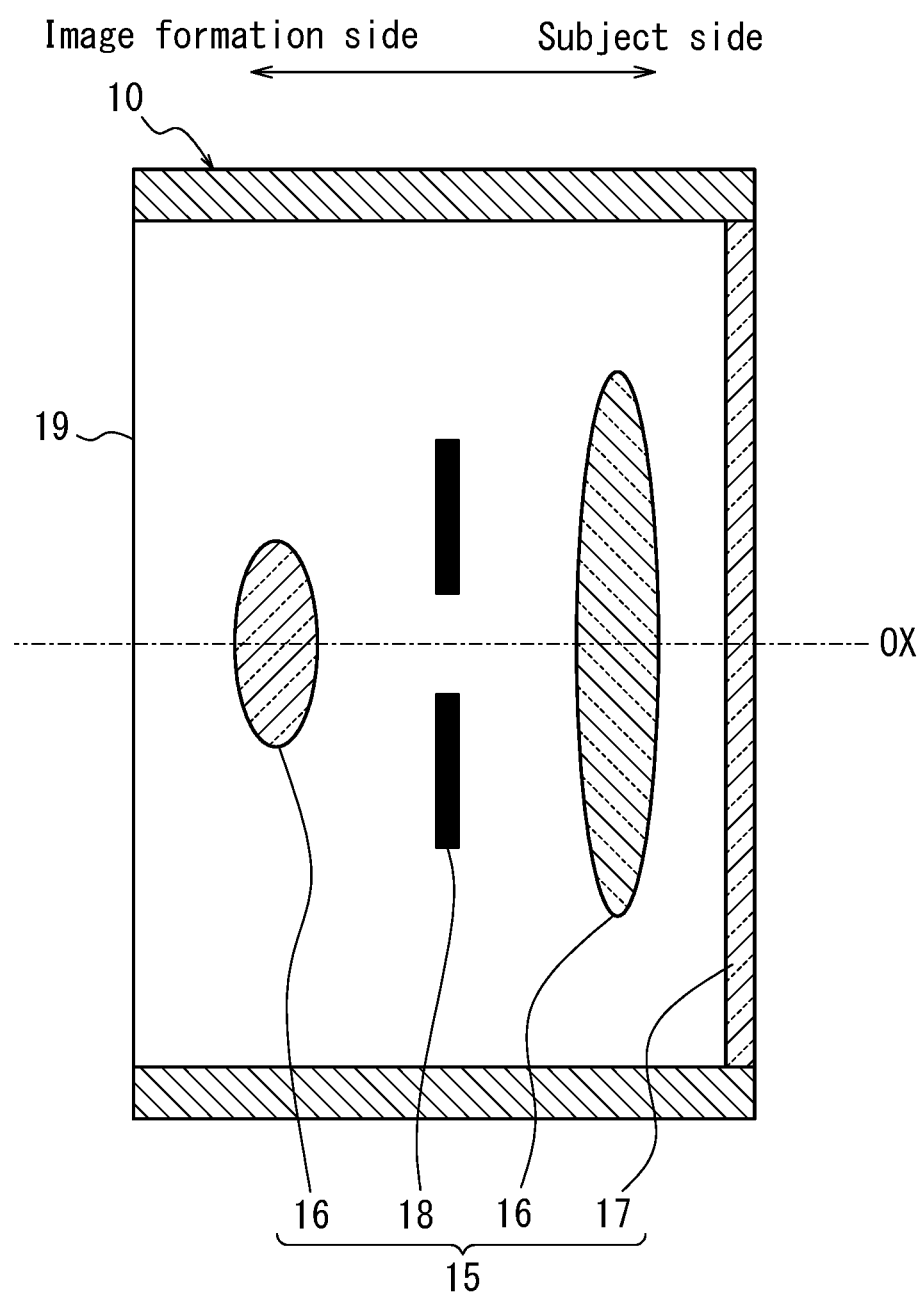
FIG. 2 is a cross-sectional view of the lens unit of FIG. 1 along an optical axis.

A structure of the lens unit 10 will be described with reference to FIG. 2. FIG. 2 is a cross-sectional view of the lens unit 10 along an optical axis OX. The lens unit 10 includes an optical system 15.

The optical system 15 includes various optical members including at least one lens 16. According to the present embodiment, for example, the optical system 15 includes a plurality of lenses 16 and a cover glass 17 as the optical members. In the optical system 15, along the optical axis OX, one side is determined as the subject side and the other side as an image formation side. The plurality of lenses 16 are disposed, together with the aperture 18, on the image formation side from the cover glass 17 and accommodated inside a housing 19 of the lens unit 10. Of all the optical members for transmitting the subject image, the cover glass 17 is disposed closest to the subject. According to the present embodiment, the cover glass 17 is disposed outside a predetermined distance range from the optical system 15 of the observation-target subject. The plurality of lenses 16 and the aperture 18 are formed and combined in such a manner that the optical system 15 has desired optical properties such as, for example, a focus distance and the depth of field.

Figure 3:
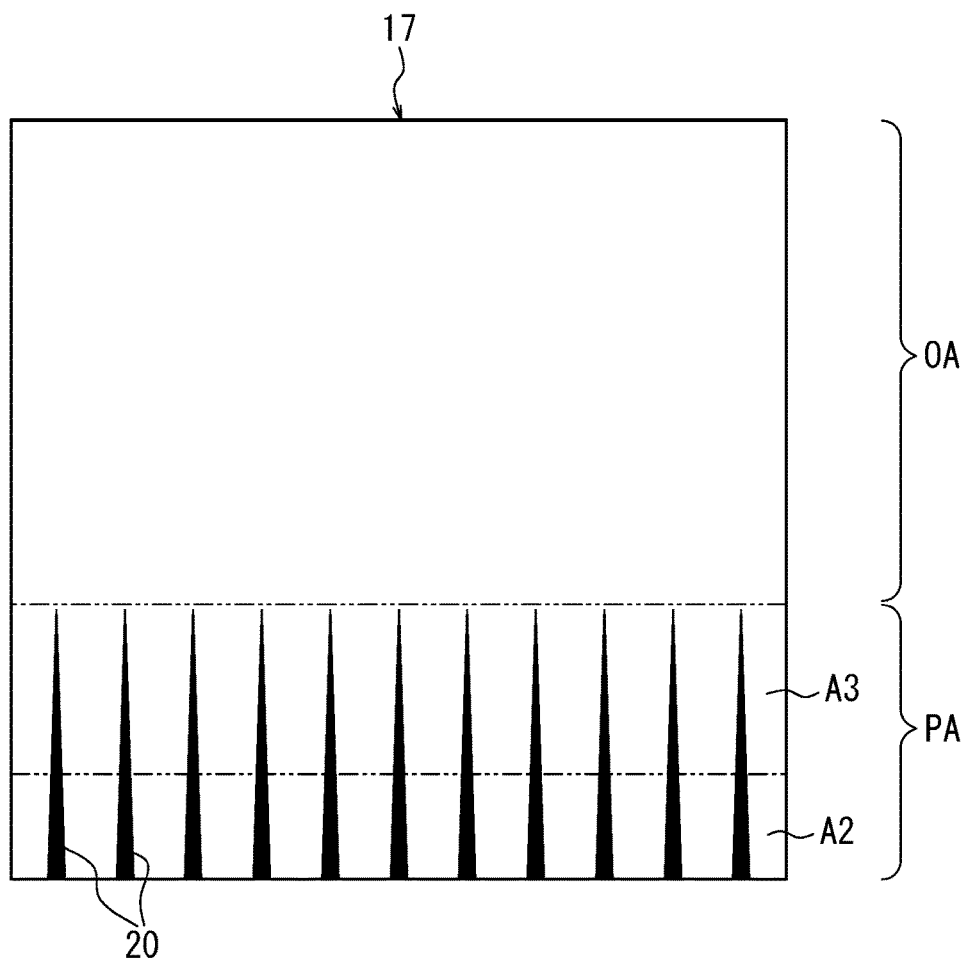
FIG. 3 is an elevation view of a cover glass of FIG. 2.

As illustrated in FIG. 3, in a predetermined area PA on a subject-side surface of the cover glass 17, at least one groove 20, preferably a plurality of grooves 20 are provided. As illustrated in FIG. 4, the predetermined area PA includes an outer area A2 outside an area A1 on the subject-side surface of the cover glass 17 through which luminous flux LX1 of the optical image of the subject within an effective imaging range used by the optical system 15 for image formation travels. Especially when the imaging apparatus 11 is mounted on the movable body 12, the outer area A2 in a lower portion of the cover glass 17 is included in the predetermined area PA. The predetermined area PA also includes an area A3 on the subject-side surface through which luminous flux LX2 of an optical image of a non-observation-target subject such as, for example, a bumper 21 of the vehicle used by the optical system 15 for image formation travels. Further, the predetermined area PA is treated with hydrophilic coating, while an area OA other than the predetermined area PA is treated with water-repellent coating.

A width of the groove 20 is equal to or smaller than a width resolvable by the optical system 15. In other words, a width of an image of the groove 20 formed by the optical system 15 is equal to or smaller than a pixel pitch of the image sensor 14. Further, the groove 20 is painted black.

In the lens unit of the present embodiment structured as described above, since the groove 20 is provided to the optical member (the cover glass 17) disposed closest to the subject, water droplets sitting on the optical member may be guided by a capillary phenomenon and removed.

According to the lens unit of the present embodiment, also, since the area OA other than the predetermined area PA has the water-repellent property and the predetermined area PA has hydrophilic property, the water droplets sitting on the surface of the optical member (the cover glass 17) is likely to be guided to the predetermined area PA from the area OA other than the predetermined area PA. Therefore, the lens unit 10 has an improved water-droplets removing property.

According to the lens unit of the present embodiment, also, since the groove 20 is provided in the predetermined area PA, an imprint of the groove 20 on the observation target subject in the image observed by the imaging apparatus 11 may be suppressed. In particular, by partially providing the groove 20 in the outer area A2 outside the area A1 on the subject-side surface through which the luminous flux LX1 of the optical image of the subject used by the optical system 15 for image formation travels, an imprint of the part of the groove 20 in the image is completely prevented. Further, by partially providing the groove 20 in the area A3 on the subject-side surface through which the luminous flux LX2 of the optical image of the non-observation target subject (for example, the bumper 21) used by the optical system 15 for image formation travels, the part of the groove 20 may be prevented from affecting the image of the observation-target subject being observed and, also, may reach inside the optical member (the cover glass 17). Therefore, the water droplets sitting at the center of the surface of the cover glass 17 may also be easily removed.

According to the lens unit of the present embodiment, also, since the width of the groove 20 is equal to or smaller than the width resolvable by the optical system 15, the imprint of the groove 20 in the image captured by the imaging apparatus 11 may be suppressed.

Also, since the lens unit of the present embodiment is disposed outside the distance range of the observation-target subject, the imprint of the groove 20 in the image captured by the imaging apparatus 11 may be further suppressed.

According to the lens unit of the present embodiment, further, since the groove 20 is painted black, an influence by irregular reflection of the optical image incident on the groove 20 on the optical image of the subject formed by the optical system 15 may be suppressed.

Although the disclosure has been described based on the figures and the embodiment, it is to be understood that various modifications and changes may be implemented based on the present disclosure by those who are ordinarily skilled in the art. Accordingly, such modifications and changes are included in the scope of the disclosure.

According to the present embodiment, for example, although the groove 20 is provided to the predetermined area PA, the groove 20 may be provided to the outer area A2 alone outside the area A1 on the subject-side surface of the cover glass 17 through which the luminous flux LX1 of the optical image of the subject used by the optical system 15 for image formation travels. Or, the groove 20 may be provided to the area A3 alone on the subject-side surface through which the luminous flux LX2 of the optical image of the non-observation-target subject used by the optical system 15 for image formation travels.

According to the present embodiment, also, although the groove 20 is provided to the predetermined area PA alone, the groove 20 may be provided to the entire surface of the cover glass 17. For example, when the width of the groove 20 is as narrow as the one according to the present embodiment, and/or the cover glass 17 is disposed outside the distance range of the subject focused in the same manner as the present embodiment, the imprint of the groove 20 in the image observed by the imaging apparatus 11 may be suppressed.

Also, although according to the present embodiment the width of the groove 20 is equal to or smaller than the width resolvable by the optical system 15, the width of the groove 20 is not limited thereto in the outer area A2 outside the area A1 on the subject-side surface of the cover glass 17 through which the luminous flux LX1 of the optical image of the subject used by the optical system 15 for image formation travels.

Also, although according to the present embodiment the groove 20 is painted black, the predetermined area described above may be painted black in its entirety.

Further, although in the above embodiment the groove 20 is provided to the cover glass 17, this is not restrictive. For example, when there is no cover glass and, of the optical members, a lens is disposed closest to the subject, the groove 20 provided to the lens may achieve an effect similar to that of the present embodiment.

REFERENCE SIGNS LIST

10 lens units
11 imaging apparatus
12 movable body
13 display apparatus
14 image sensor
15 optical system
16 lens
17 cover glass
18 aperture
19 housing
20 groove
21 bumper
A1 area on subject-side surface of cover glass through which luminous flux of optical image of subject used by optical system for image formation travels
A2 outer area
A3 area on subject-side surface through which luminous flux of optical image of non-observation-target subject used by optical system for image formation travels
LX1 luminous flux of optical image of subject within effective imaging range
LX2 luminous flux of optical image of non-observation-target subject
OA area other than predetermined area
OX optical axis
PA predetermined area

The invention claimed is:

1. A lens unit comprising:
an optical system configured to form an optical image of a subject, the optical system including an optical member disposed closest to the subject,
wherein the optical member is a lens or a cover glass of the lens unit,
the optical member has at least one groove, extending to the edge of the optical member, on an exposed subject-side surface of the optical member,
the groove is configured to remove fluid from the optical member, and
the optical member transmits the optical image of the subject.

2. The lens unit according to claim 1, wherein
on the subject-side surface, the groove is provided in a predetermined area having hydrophilic property.

3. The lens unit according to claim 2, wherein
an area other than the predetermined area has water-repellent property.

4. The lens unit according to claim 2, wherein
the predetermined area includes an outer area outside an area on the subject-side surface through which luminous flux of an optical image of the subject within an effective imaging range used by the optical system for image formation travels.

5. The lens unit according to claim 2, wherein
the predetermined area includes an area on the subject-side surface through which luminous flux of an optical image of a non-observation-target subject used by the optical system for image formation travels.

6. The lens unit according claim 1, wherein
a width of the groove is equal to or smaller than a width unresolvable by the optical system.

7. The lens unit according to claim 1, wherein
the optical member is arranged outside a distance range of an observation-target subject predetermined for the optical system.

8. The lens unit according to claim 1, wherein
at least the groove is black in color.

9. An imaging apparatus comprising:
a lens unit according to claim 1; and
an image sensor configured to capture a subject image formed by the lens unit.

10. An on-vehicle camera having the imaging apparatus according to claim 9.

11. The on-vehicle camera according to claim 10, wherein
the groove is provided in the area on the subject-side surface through which luminous flux of the optical image of the non-observation-target subject of a vehicle having the on-vehicle camera mounted thereon for image formation travels.

12. The lens unit according to claim 1, wherein
the optical member has a plurality of grooves on the subject-side surface, and
the grooves are substantially parallel to each other.

* * * * *